United States Patent [19]

Thomsen

[11] 4,162,560
[45] Jul. 31, 1979

[54] SPACER SUPPORT FOR PANEL MEMBERS

[75] Inventor: Jack W. Thomsen, LaGrange Park, Ill.

[73] Assignee: Weckessar Company, Inc., Chicago, Ill.

[21] Appl. No.: 862,000

[22] Filed: Dec. 19, 1977

[51] Int. Cl.² .................. A44B 21/00; A44B 17/00
[52] U.S. Cl. ........................... 24/73 P; 24/73 PF; 24/208 A; 24/213 CS; 85/5 R
[58] Field of Search ............ 24/73 PF, 73 P, 213 CS, 24/208 A, 73 PM; 85/5 R, DIG. 2

[56] References Cited

U.S. PATENT DOCUMENTS

| 3,153,294 | 10/1964 | Hay ........................ 24/73 P |
| 3,733,655 | 5/1973 | Kolibar .................... 24/73 P |
| 3,764,729 | 10/1973 | Kowalewski ............ 24/73 P |
| 3,777,052 | 12/1973 | Fegen ..................... 24/73 P |
| 3,815,182 | 6/1974 | Guard ..................... 24/73 P |

Primary Examiner—Bernard A. Gelak

[57] ABSTRACT

A detachable reusable spacer support providing an interlocking assembly by which it is connected to panel members for maintaining the spacing therebetween while utilizing a minimum of panel area.

4 Claims, 10 Drawing Figures

4,162,560

SPACER SUPPORT FOR PANEL MEMBERS

SUMMARY OF THE INVENTION

This invention relates to a support and spacer for panel members and provides means for detachably securing the support to spaced panel members and includes flexible means for mounting panel members of various thicknesses in spaced relation and for providing a limited cushioned movement between stacked panel assembles without disengagement.

The spacer support when assembled to a panel or a stack of panels utilizes a minimum of panel area, in that the locking means occupies one-half of a preformed panel hole, thus permitting a second or corresponding support to be used on the opposite side of the panel, with its locking means occupying the remaining one-half of the panel hole.

It is desired that the spacer support be of a one-piece molded plastic body which provides a retention stem portion that includes a novel cushioning means to maintain positive but cushioned mounting for panels of various thicknesses and which includes a capping unit which cooperates with the spacer to provide for screw mounting of the assembly to the panels. This invention, when assembled to a panel or a stack of panels, utilizes a minimum of panel area and provides insulation and support, as well as being easy and convenient to assemble and economical to produce.

General Description

The objects of the invention are accomplished by the preferred form of construction, which is shown in the accompanying drawings, and in which.

Figure 5:
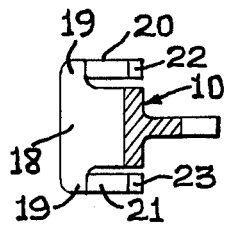
FIG. 5 is a detailed sectional view of the spacer support.

The spacer support as shown in the drawings is preferably constructed as a one-piece molded plastic body 10, the medial portion of which is generally T-shaped in cross section as seen in FIG. 5.

The body of the spacer support is so constructed that the ends thereof are duplications of each other and therefore only one end will be specifically described in detail, with the components identified by reference numerals and with the corresponding components of the opposite end identified by corresponding reference numerals primed.

Figure 1:
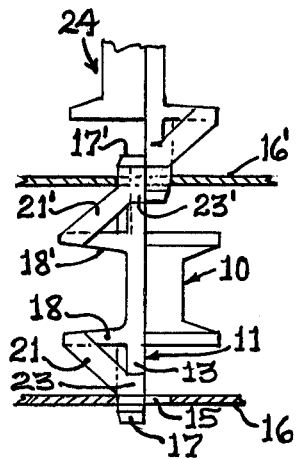
FIG. 1 is a fragmentary side elevational view of the spacer support in relation to spaced panel members.

As shown in FIG. 1, the body 10 is formed to provide a bifurcated stem 11. The bifurcation of the stem 11 results in the formation of separate legs 12 and 13. These legs 12 and 13 are of semicircular configuration in cross section, and therefore provide arcuate segments 14 matching the diameter of the mounting hole 15 formed in the panel member 16, such as to occupy 180° of the complete panel hole 15.

Figure 3:
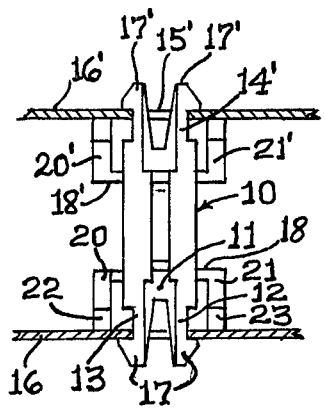
FIG. 3 is a rear elevational view of the spacer support.
Figure 4:
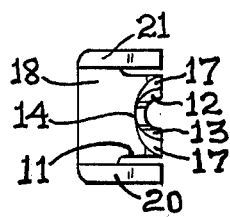
FIG. 4 is a bottom view of the spacer support of this invention.

The free ends of the legs 12 and 13 are enlarged to provide barbs 17, which are adapted to engage the underside of the panel 16 when the legs 12 and 13 are projected into the panel hole 15, as seen in FIGS. 1 and 3.

The web 18 extends laterally from one side of the body 10 and at its free end is of a width greater than that of the body 10, thus providing wings 19.

Extending from the wings 19 in the direction of the legs 12 and 13 are arms 20 and 21. These arms 20 and 21 terminate into angled ends 22 and 23. The total length of the arms 20 and 21 and their ends 22 and 23 is less than the length of the legs 12 and 13 so that the angled ends 22 and 23 are spaced outboard of the barbs 17 formed on the ends of the legs 12 and 13, as shown in FIGS. 2 and 3.

Figure 2:
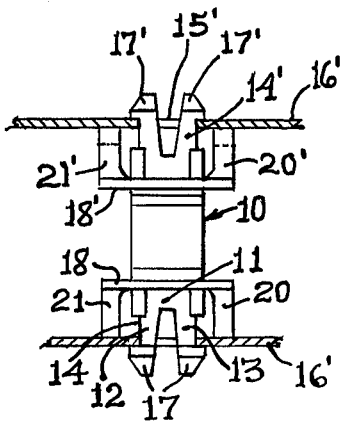
FIG. 2 is a front elevational view of the spacer support.

In mounting the body 10 to the spaced panel members such as 16 and 16', as shown in FIGS. 1, 2 and 3, the legs 12 and 13 of the bifurcated stems 11 and 11' are projected into the preformed panel holes 15. In order to project the legs 12 and 13 into the hole 15, a slight compression of the legs toward each other is required, with the legs then snapping outwardly so as to engage the inner surface defining the panel hole 15, with the barbs 17 formed on the ends of the legs 12 and 13 engaging a portion of the wall surface surrounding the panel hole 15. The angled ends 22 and 23 of the arms 20 and 21 will bear on opposite wall surfaces of the panel 16 outwardly of the point of engagement of the barb 17 with the opposite wall surface of the panel member 16 as shown in FIGS. 2 and 3.

The corresponding identical opposite end of the body 10 is likewise engaged into a panel hole 15' of the desired spaced panel member 16'. If it is required that a number of panel members such as 16 and 16' are desired to be stacked, a second spacer support 24 may be projected into the remaining 180° of the panel hole 15, such as shown in FIG. 1.

Figure 9:
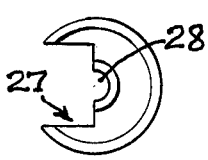
FIG. 9 is a top plan view of the capping member.
Figure 10:
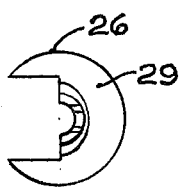
FIG. 10 is a bottom plan view of the capping member.

It is desired to make a complete assembly for the spacer support, and therefore there is provided a capping unit 25 as shown in FIGS. 7 through 10. This capping unit 25 provides a truncated cap 26 which has a segment thereof notched out as at 27, as shown in FIG. 9, with the notched-out portion 27 then being provided with a one-half circular counterbore 28. From the underside 29 of the cap 26 project yieldable legs 30 and 31, which terminate into enlarged barbed ends 32 and 33. These legs 30 and 31 are semicircular in cross section and, as such, are of a diameter so as to cooperate with the legs 12 and 13 of the spacer support body 10 when both the body 10 and capping unit 25 are mounted into the same panel hole 15 to completely fill the panel hole 15. The semicircular counterbore 28 mates with the arcuate segments 14 provided by the legs 12 and 13 and provides a circular reception hole into which may be threaded a fastening screw or the like, fixedly securing the capping unit 25 and the spacer support 10 to the endmost panel member 16.

Figure 6:
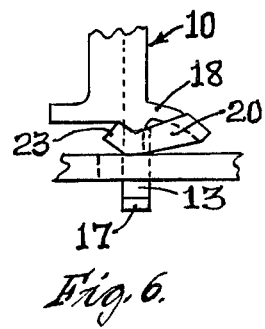
FIG. 6 is a fragmentary side elevational view of the spacer support in a tensioning position.
Figure 7:
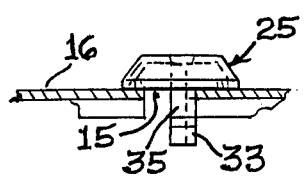
FIG. 7 is a side elevational view of the capping unit mounted on a panel member.
Figure 8:
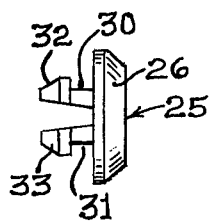
FIG. 8 is an end perspective view of the capping member.

In the event that the spaced panel members are subject to vibration or external force that in effect tends to move the panels in the direction of each other, such vibration or external forces will be absorbed by the arms 20 and 21 as shown in FIG. 6, which will yield under such stress while continuing to retain the spacer support in its attached position between such panels and which will tend to return the panels to their original spaced relation upon termination of the vibration or external force.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A spacer support assembly connectible to either side of a panel member having a circular mounting hole formed therein into which portions of cooperating assemblies are projectable so as to connect a plurality of panels in stacked spaced relation comprising:
   (a) an elongated molded plastic body,
   (b) said body terminating at each end solely by a pair of longitudinally extending legs,
   (c) said pair legs being semi-circular in cross section and extending from one side of a longitudinal center plane that extends through the longitudinal center line of said body and adapted for projection through one-half of the mounting hole formed in the panel member,
   (d) means provided by said legs for embracing a wall portion of the panel member defining the mounting hole formed therein, and
   (e) means carried by said body adjacent to both ends thereof and inwardly of said legs and yieldably engaging an opposite wall portion of the panel member defining the mounting hole and cooperating with said means provided by said legs for detachably mounting said spacer support assembly to the panel member.

2. A spacer support assembly as defined by claim 1 including a cap member adapted to be frictionally mounted on the panel member and cooperating with said means provided by said legs for covering the mounting hole formed in the panel member after the spacer support has been mounted thereon.

3. A spacer support assembly as defined by claim 2, wherein said means carried by said body adjacent both ends thereof are a pair of flexible arms disposed in a parallel plane with respect to said body and angularly with respect to said legs and cooperating with said legs for detachably mounting said spacer support assembly to the panel.

4. A spacer support assembly as defined by claim 1, wherein said means carried by said body adjacent both ends thereof comprise a pair of flexible arms disposed in a parallel plane with respect to said body and angularly with respect to said legs and adapted to engage an opposite face portion of the panel member defining the mounting hole formed therein.

* * * * *